United States Patent [19]

Verdult et al.

[11] 4,233,336
[45] Nov. 11, 1980

[54] METHOD OF APPLYING LUMINESCENT MATERIAL TO A GLASS SUPPORT

[75] Inventors: Josephus A. Verdult; Lambertus W. J. Manders, both of Eindhoven, Netherlands

[73] Assignee: U.S. Philips Corporation, New York, N.Y.

[21] Appl. No.: 51,490

[22] Filed: Jun. 25, 1979

Related U.S. Application Data

[63] Continuation of Ser. No. 868,803, Jan. 12, 1978, abandoned, which is a continuation of Ser. No. 729,951, Oct. 6, 1976, abandoned.

[30] Foreign Application Priority Data

Oct. 17, 1975 [NL] Netherlands ............... 7512188

[51] Int. Cl.³ .............. B05D 3/02; C09K 11/465; H01J 61/44; B05D 7/22
[52] U.S. Cl. ............................. 427/67; 427/106; 427/157
[58] Field of Search ..................... 427/67, 106, 157

[56] References Cited

U.S. PATENT DOCUMENTS

| | | | |
|---|---|---|---|
| 2,676,894 | 4/1954 | Anderson | 252/301.36 |
| 2,726,966 | 12/1955 | Anderson | 252/301.36 |
| 3,461,077 | 8/1969 | Kobayashi | 252/301.36 |
| 3,707,376 | 12/1972 | Patel | 252/301.36 |
| 3,723,787 | 3/1973 | Blasse | 313/468 |
| 3,887,753 | 6/1975 | Ninagawa | 252/301.36 |
| 3,937,998 | 2/1976 | Verstegen | 313/487 |
| 3,989,977 | 11/1976 | Ashizaki | 313/468 |
| 3,999,993 | 12/1976 | Patel | 313/468 |

OTHER PUBLICATIONS

Evtushenko, C. A. 45, 7960c, (1951).
Kasawara, C. A. 47, 6579c, (1952).

*Primary Examiner*—James R. Hoffman
*Attorney, Agent, or Firm*—Robert S. Smith

[57] ABSTRACT

To apply of a coat of granular luminescent material which comprises an yttrium compound an aqueous suspension is used which contains an alginate as a binder.

4 Claims, 1 Drawing Figure

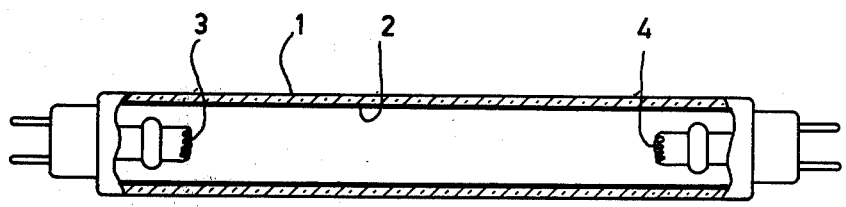

METHOD OF APPLYING LUMINESCENT MATERIAL TO A GLASS SUPPORT

This a continuation of application Ser. No. 868,803, filed Jan. 12, 1978, which was a continuation of Ser. No. 729,951, filed Oct. 6, 1976, both now abandoned.

The invention relates to a method of applying a luminescent layer to a glass support and to a product, a gas discharge lamp in particular, having such a coated support.

With gas discharge lamps and cathode-ray tubes it is often necessary to apply a coat of granular luminescent material to a glass support. Various methods are known. One of the most usual methods, particularly for low pressure mercury vapour discharge lamps, consists in that the granular luminescent material is suspended in some evaporable medium or other. This suspension is brought into contact for some time with the glass support, such that a coat of luminescent material is deposited on the glass support. To have the luminescent material adhere to the support a temporary binder is incorporated in the suspension which binder is soluble in the suspension medium. The binder is chosen so that it ensures stability of the suspension and the requisite viscosity. In one of the most frequently used methods butyl-acetate in which nitrocellulose is dissolved as a binder is used for coating the interior of tubular low-pressure mercury vapour discharge lamps.

The use of butyl-acetate has the great disadvantage that it is toxic to a certain degree and is consequently harmful to the environment. This does not only hold during the application of the coating but particularly for the next, necessary step, namely evaporating the butyl-acetate. It is of course possible to take rigorous measures to extract, or, possibly, burn the vapours or to make them harmless but this makes the whole procedure considerably more expensive.

As an alternative for butyl-acetate it has been proposed to utilize water as suspension medium and binders which can be dissolved therein. Such binders are, for example, carboxy-methyl-cellulose, polyvinyl-methyl-ether-maleic-acid anhydride or polyacrylates.

Although in general good results could be obtained with these aqueous suspensions it appears that in some cases difficulties arise, particularly with those luminescent materials which are slightly water-soluble, such as europium-activated yttrium-oxide and yttrium-oxysulphide, as aqueous suspensions of these substances become quickly unstable. Apparently the stabilizing effect which the binder exercises in the suspension is no longer sufficient owing to the influence of these luminescent materials.

Dutch Patent Application No. 7.313.694, which has been laid open to public inspection, discloses a low-pressure mercury vapour discharge lamp which combines a very high luminous efficiency with a very good colour rendition. As red luminescing material this lamp contains, for example, yttrium-oxide which has been activated with trivalent europium. As stated above this yttrium-oxide causes difficulties when an aqueous suspension is used which contains one of said binders. So in the production of such a lamp, which may in principle result in a saving in energy one would from necessity be forced to use a solvent which is hostile to the environment. The invention now provides a way out from the dilemma either to (during operation of the lamp) use more energy or to pollute the environment (during manufacture).

According to the invention, for the application of granular luminescent yttrium compounds on a glass support an aqueous suspension medium is used in which a quantity of alginate has been dissolved which serves as a binder.

The use of alginates in aqueous suspensions is known per se, for example from United States Patent Specification No. 2,676,894. However, the specific use and the advantages thereof when applying yttrium compounds is not described therein and is, so far, also unknown from other sources.

As is, for example disclosed in the above-mentioned United States Pat. Specification alginates are natural materials which can be extracted from seaweed. They are high-molecular polymers having satisfactory stabilizing and viscosity-controlling properties. Besides that they easily dissolve in water; furthermore they are readily removed by burning. The latter is of course also important in the production of luminescent layers, particularly in low-pressure mercury vapour discharge lamps because no organic substances can be tolerated in the ultimate product. Consequently, after the coating has been applied, the support is invariably heated in an oxidizing atmosphere in order to burn the binder.

With a method according to the invention ammonium alginate and magnesium alginate in particular yield very good uniform coats. United States Pat. Specification No. 2,676,895 already discloses the use of ammonium-alginate.

Tests have shown that a quantity of 0.5 to 2.5% of alginate, calculated relative to the weight of the luminescent material in the suspension gives a particularly good adhesion of the luminescent material and a nice appearance of the deposited coating. If less than 0.5% is used the stabilisation is insufficient; if more than 2.5% is used, a longer period of time is then of course required to remove the binder by means of burning. In practice a percentage of 0.8 to 0.9% is particularly satisfactory.

The percentage by weight as stated above is calculated relative to the total quantity of luminescent material; if the yttrium compound, for example yttrium oxide activated by trivalent europium, is mixed with other luminescent materials, for example those which are mentioned in the above-mentioned Dutch Patent Application No. 7,313,694 as being particularly fovourable for the production of an excellent low pressure mercury vapour discharge lamp, the quantity of alginate is calculated relative to the total weight of these three components. Practice has shown that a quantity of luminescent material of between 400 and 800 g should preferably be used for each liter of the suspension.

The invention will now be further explained with reference to an embodiment for preparing a suitable suspension.

EXAMPLE 10 g ammonium-alginate is dissolved in 1 liter water. The solution obtained has a viscosity of 400 to 500 centipoises. Thereafter 500 g luminescent material and 300 ml water are added to 400 ml of the above-mentioned solution and the mixture is stirred until a homogeneous, stable suspension has been obtained. The percentage by weight of ammonium-alginate in this suspension then amounts to 0.8 relative to the quantity of luminescent material.

The suspension prepared in accordance with the above recipe may be used to coat in known manner the inner wall of a low-pressure mercury vapour discharge lamp, for example as described in United States Pat. Specificiation No. 2,676,894.

The drawing shows diagrammatically a low-pressure mercury vapour discharge lamp with a luminescent coating which is produced to a method according to the invention.

In the drawing reference 1 is the glass wall whose interior surface is coated with a coating 2 of granular luminescent material, for example consisting of a mixture of 3 components as disclosed in Dutch Patent Application No. 7.313.694. Reference numerals 3 and 4 indicate the electrodes between which a gas discharge is produced which renders the coating 2 luminescent.

What is claimed is:

1. A method for applying a coating of luminescent material to a glass surface which comprises the steps of: providing a luminescent material which consists of granular particles, each individual particle being homogeneous throughout the extent thereof, some of said granular particles being yttrium oxide activated by trivalent europium; providing a solution which consists of water and an alginate and which contains at least 0.5% of alginate relative to the weight of said luminescent material; mixing said solution and said luminescent material to obtain a stable suspension, coating the glass surface with said suspension and then heating said suspension sufficiently to burn off said alginate.

2. A method as claimed in claim 1 wherein the aqueous alginate solution contains 0.5 to 2.5% of alginate calculated relative to the weight of the luminescent material.

3. A method as claimed in claim 1 wherein said aqueous solution contains 0.8 to 0.9% of alginate calculated relative to the weight of the luminescent material.

4. A method as claimed in claim 1 wherein each liter of suspension includes 400 to 800 g of luminescent material.

* * * * *